US011620475B2

United States Patent
Narayanan et al.

(10) Patent No.: US 11,620,475 B2
(45) Date of Patent: Apr. 4, 2023

(54) DOMAIN TRANSLATION NETWORK FOR PERFORMING IMAGE TRANSLATION

(71) Applicant: Ford Global Technologies, LLC, Dearborn, MI (US)

(72) Inventors: Praveen Narayanan, San Jose, CA (US); Nikita Jaipuria, Union City, CA (US); Punarjay Chakravarty, Campbell, CA (US); Vidya Nariyambut murali, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 16/829,114

(22) Filed: Mar. 25, 2020

(65) Prior Publication Data

US 2021/0303926 A1 Sep. 30, 2021

(51) Int. Cl.
*G06K 9/62* (2022.01)
*G06N 3/04* (2006.01)
*G06N 3/08* (2006.01)
*G06N 3/049* (2023.01)

(52) U.S. Cl.
CPC .......... *G06K 9/6257* (2013.01); *G06N 3/049* (2013.01); *G06N 3/08* (2013.01)

(58) Field of Classification Search
CPC .... G06K 9/6257; G06K 9/6274; G06N 3/049; G06N 3/08; G06N 3/0445; G06N 3/0454; G06N 3/084; G06V 10/82; G06V 20/56; G06T 3/0012
See application file for complete search history.

(56) References Cited

U.S. PATENT DOCUMENTS

| | | | |
|---|---|---|---|
| 10,192,327 B1 * | 1/2019 | Toderici | G06K 9/6256 |
| 2018/0247201 A1 * | 8/2018 | Liu | G06N 3/0454 |
| 2019/0287217 A1 | 9/2019 | Cooke et al. | |
| 2019/0377979 A1 * | 12/2019 | Jiang | G06K 9/6262 |

FOREIGN PATENT DOCUMENTS

| | | |
|---|---|---|
| DE | 02017222600 B3 | 12/2018 |
| WO | 2018192672 A1 | 10/2018 |
| WO | 2018194456 A1 | 10/2018 |
| WO | 2018217828 A1 | 11/2018 |

* cited by examiner

*Primary Examiner* — Jianxun Yang
(74) *Attorney, Agent, or Firm* — Frank A. MacKenzie; Bejin Bieneman PLC (57) ABSTRACT

The present disclosure discloses a system and a method that includes receiving, at a decoder, a latent representation of an image having a first domain, and generating a reconstructed image having a second domain, wherein the reconstructed image is generated based on the latent representation.

12 Claims, 9 Drawing Sheets

DOMAIN TRANSLATION NETWORK FOR PERFORMING IMAGE TRANSLATION

BACKGROUND

Deep neural networks (DNNs) can be used to perform many image understanding tasks, including classification, segmentation, and captioning. Typically, DNNs require large amounts of training images (tens of thousands to millions). Additionally, these training images typically need to be annotated for the purposes of training and prediction.

DETAILED DESCRIPTION

A system is disclosed that includes a computer including a processor and a memory. The memory includes instructions such that the processor is programmed to receive, at a decoder, a latent representation of an image having a first domain; and generate a reconstructed image having a second domain, wherein the reconstructed image is generated based on the latent representation.

In other features, the processor is further programmed to receive the image having the first domain; and generate, at an encoder, the latent representation.

In other features, the encoder comprises a sequential encoder.

In other features, the sequential encoder comprises a convolutional filter and highway network.

In other features, the sequential encoder comprises a gated recurrent unit connected to the convolutional filter and highway network.

In other features, the decoder comprises a sequential decoder.

In other features, the sequential decoder includes an attention recurrent neural network layer.

In other features, the sequential decoder includes a decoder recurrent neural network layer connected to the attention recurrent neural network layer.

In other features, the sequential decoder includes a deconvolutional neural network layer connected to the decoder recurrent neural network layer.

In other features, the image is generated by a generator.

A method is disclosed that includes receiving, at a decoder, a latent representation of an image having a first domain; and generating a reconstructed image having a second domain, wherein the reconstructed image is generated based on the latent representation.

In other features, the method includes receiving the image having the first domain; and generating, at an encoder, the latent representation.

In other features, the encoder comprises a sequential encoder.

In other features, the sequential encoder comprises a convolutional filter and highway network.

In other features, the sequential encoder comprises a gated recurrent unit connected to the convolutional filter and highway network.

In other features, the decoder comprises a sequential decoder.

In other features, the sequential decoder includes an attention recurrent neural network layer.

In other features, the sequential decoder includes a decoder recurrent neural network layer connected to the attention recurrent neural network layer.

In other features, the sequential decoder includes a deconvolutional neural network layer connected to the decoder recurrent neural network layer.

In other features, the image is generated by a generator.

Autonomous vehicles typically employ perception algorithms, or agents, to perceive the environment around the vehicle. However, training the perception algorithms typically requires large amounts of data. Gaming engines can be used to simulate data, such as synthetic images, that depict objects of interest to the perception algorithms. The objects of interest may include other vehicles, trailers, pedestrians, street markings, signs, or the like. However, the synthetic data may not appear "real." As a result, the training of perception algorithms using synthetic data may not correspond to the training of perception algorithms using real, i.e., non-generated, data.

The present disclosure is directed to a domain translation network that generates a sequence of images. For example, a sequence of images having a first domain may be input into the domain translation network, and the domain translation network generates a sequence of images having a second domain based on the sequence of images having the first domain. As described herein, the domain translation network may employ an encoder-decoder architecture. The encoder portion may encode the sequence images having the first domain into a latent representation of the images. The decoder may be configured to decode data based on the latent representation to reconstruct images having the second domain.

While the present disclosure describes a vehicle system and a server, it is understood that any suitable computer system may be used to perform the techniques and/or the functionality of the adversarial neural network described herein.

Figure 1:
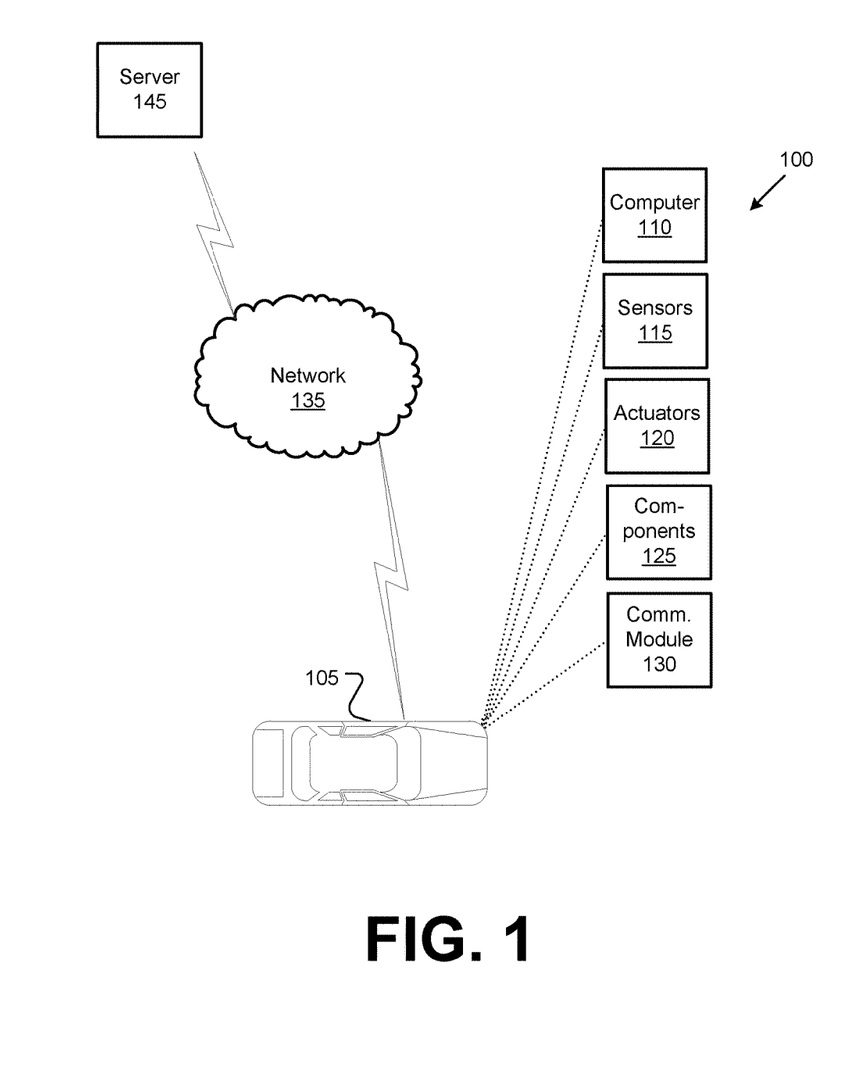
FIG. 1 is a diagram of an example system for training an adversarial network.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
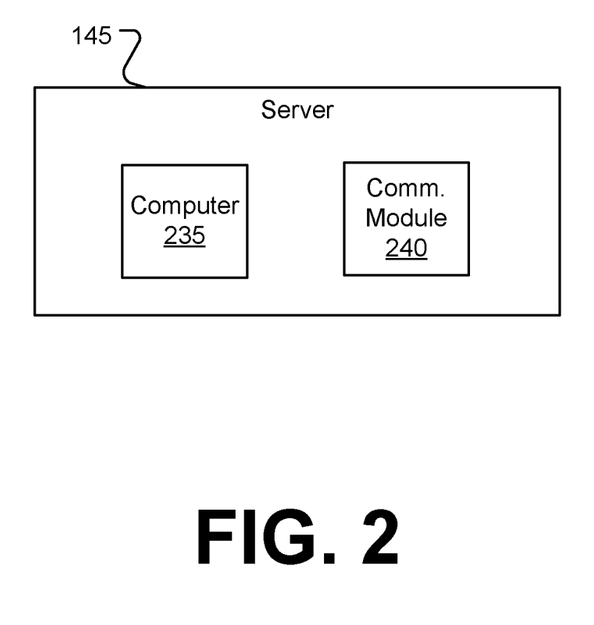
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
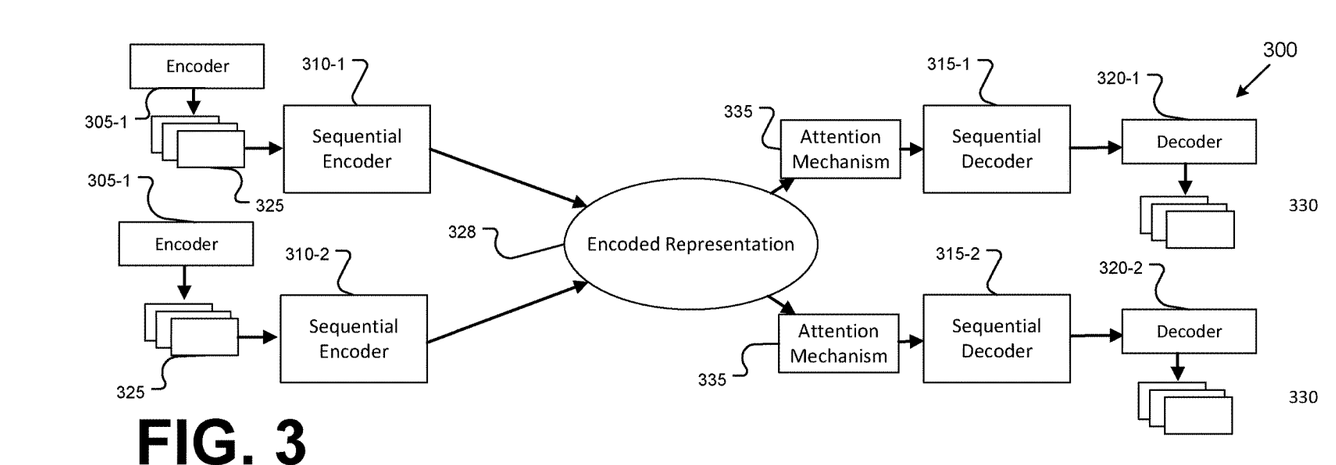
FIG. 3 is a diagram of an example domain translation network.

FIG. 3 is a diagram of an example domain adaptation network 300 that generates domain translated image sequences. The domain adaptation network 300 can be a software program that can be loaded in memory and executed by a processor in the vehicle 105 and/or the server 145, for example. For example, the domain adaptation network 300 can receive a sequence of images in a first domain (daytime) representing a video and output a sequence of images in a second domain (nighttime). The domain adaptation network 300 includes a first latent feature extractor 305-1, a second latent feature extractor 305-2, a first sequential encoder 310-1, a second sequential encoder 310-2, a first sequential decoder 315-1, a second sequential decoder 315-2, first decoder 320-1, and a second decoder 320-2.

The latent feature extractors 305-1, 305-2 comprise trained variational autoencoders (VAE) neural networks that receive one or more images as input and encodes the images into a latent, i.e., hidden, representation space (e.g., latent features). The hidden representation may be referred to as a latent representation or latent vectors 325. The latent feature extractors 305-1, 305-2 may be implemented as one or more hidden convolutional layers and a fully connected output layer.

The latent vectors 325 generated by the latent feature extractors 305-1, 305-2 have a lower dimensionality than the images input into the latent feature extractors 305-1, 305-2. For example, the input to the encoder network might be a 28 by 28-pixel input image, which is 784-dimensional. The latent representation of the input image 323 is less than 784-dimensional.

The sequential encoders 310-1, 310-2 receive the latent vectors 325 from the corresponding latent feature extractors 305-1, 305-2. As described in greater detail below, the sequential encoders 310-1, 310-2 comprise Convolutional Banks, Highway and Gated Recurrent Units (CBHG) encoders that receive the latent vectors 325 to generate encoded representations 328 of the latent vectors 325.

The sequential decoders 315-1, 315-2 receive the encoded representations 328 and generate a sequentially decoded latent representation. The decoded latent representation, e.g., latent vectors, correspond to sequential image frames that are input to corresponding decoders 320-1, 320-2. The decoders 320-1, 320-2 may comprise trained VAE decoders that include a fully connected input layer and one or more hidden deconvolutional layers. The decoders 320-1, 320-2 receive the decoded latent representation and generate reconstructed sequential images 330 based on the decoded latent representation. The reconstructed sequential images 330 may correspond to a domain that differs with respect to a domain of the latent vectors 325 input into the sequential decoder 315-1, 315-2. The latent feature extractors 305-1, 305-2 and the decoders 320-1, 320-2 may be trained using training images. As shown, the domain adaptation network 300 includes an attention mechanism 335, which is generates a context vector and/or domain attention context based on the output of the sequential encoders 315-1, 315-2.

Figure 4:
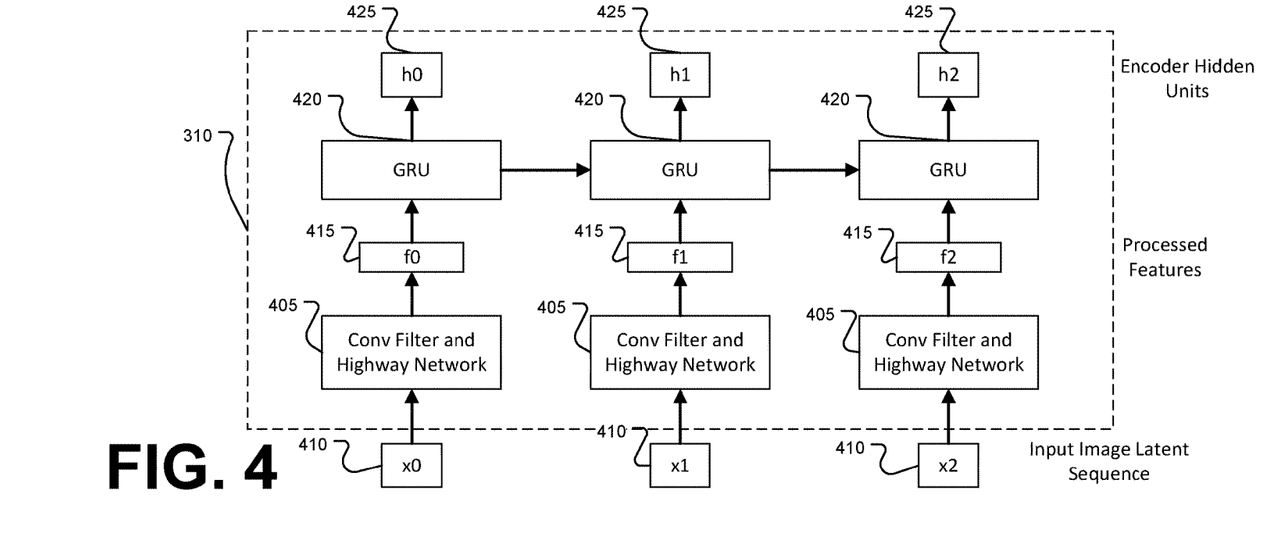
FIG. 4 is a diagram of an example sequential encoder.

FIG. 4 illustrates an example sequential encoder 310 according to an example implementation of the present disclosure. As shown, the sequential encoder 310 includes convolutional filters and highway network 405. The convolutional filters and highway network 405 may include a bank of 1-D convolutional filters that receive an input image latent sequence 410, e.g., $x_0$ through $x_1$. The input image latent sequence 410 can correspond to the latent vectors 325. The 1-D convolutional filters generate convolution outputs of the image latent sequence 410. The convolutional filters and highway network 405 also include a highway network that process the convolution outputs to generate encoded representations of the sequence of image latent features 415, e.g., f0 through f2. The sequential encoder 310 can also include one or more gated recurrent units (GRUs) 420 that receive the encoded representations of the sequence of image latent features 415 and output latent context 425, e.g., $h_0$ through $h_2$. The output latent context 425 may be referred to as "encoder hidden units." As shown, subsequent GRUs 420 can receive, as input, the latent context 425 from a previous GRU 420 and the corresponding image latent sequence. The GRUs 420 may be bidirectional GRUs to extract sequential features from both forward and backward context.

Figure 5:
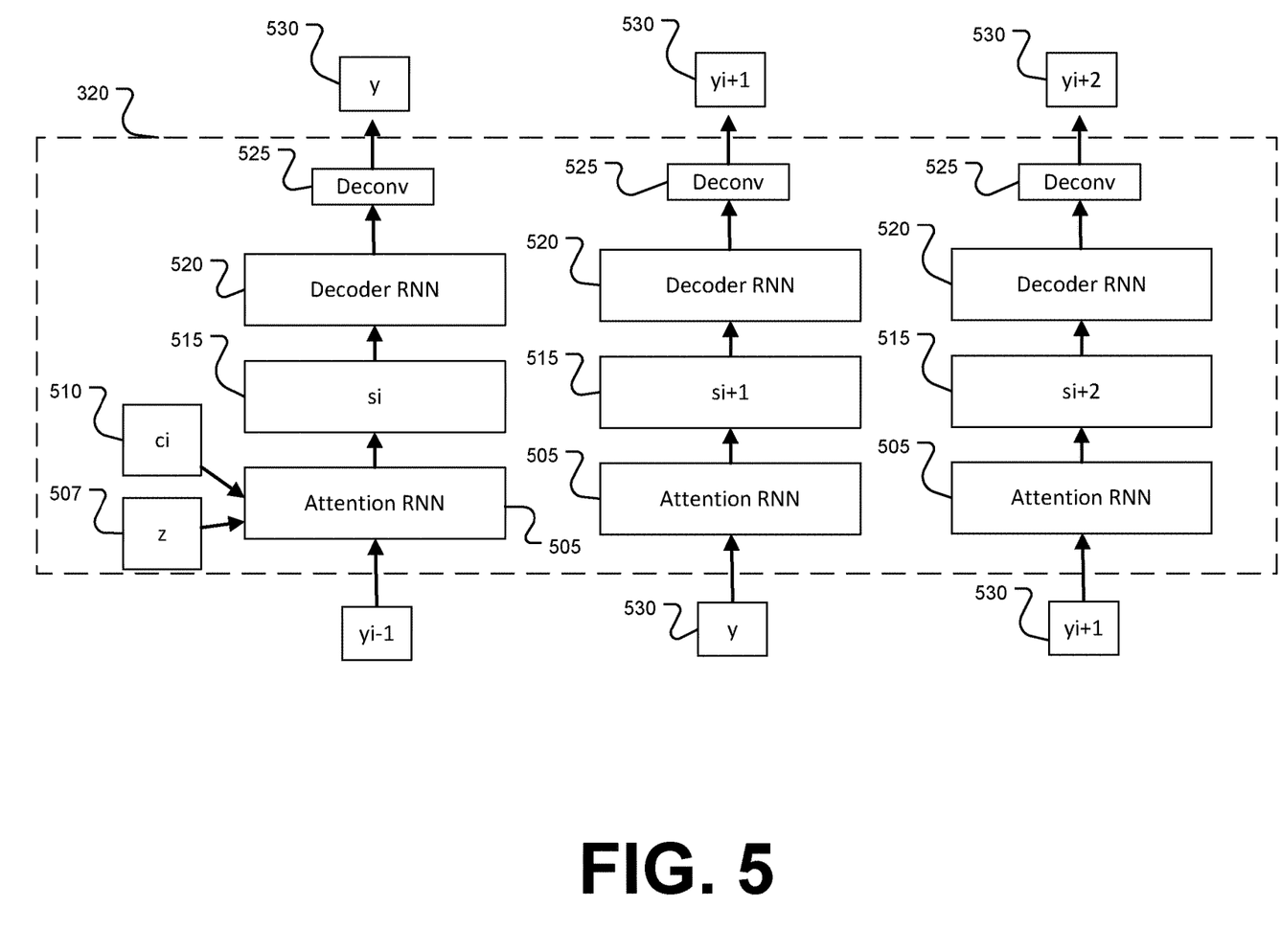
FIG. 5 is a diagram of an example sequential decoder.

FIG. 5 illustrates an example sequential decoder 315 according to an example implementation of the present disclosure. The sequential decoder 315 can include one or more attention recurrent neural network (RNN) layers 505 that receive a context vector 507 and domain attention context 510 ($c_i$) as input. The context vector 507 may be generated based on the latent context 425 by the attention mechanism 335. The domain attention context 510 can be generated by an attention mechanism 335 (see FIG. 3) associated with the domain adaptation network 300. The domain attention context 510 may provide the sequential decoder 315 with a location of interest within the sequential latent context 425. The location of interest may correspond to an action that is determined by using appearance motion information. In one or more implementations, the attention RNN layers 505 may comprise one or more GRUs. For example, the attention RNN layers 505 may comprise a 1-layer GRU.

In one or more implementations, the attention mechanism 335 can focus the sequential decoders 315-1, 315-2 on relevant sections of the input sequence. A non-limiting implementation of the attention mechanism 335 is described in "Effective Approaches to Attention-based Neural Machine Translation" by Minh-Thang Luong, Hieu Pham, and Christopher Manning, published 17 Aug. 2015, the entirety of which is incorporated herein by reference. Another non-limiting implementation of the attention mechanism 335 is described in "Hierarchiacal Sequence to Sequence Voice Conversion with Limited Data" by Praveen Narayanan, Punarjay Chakravarty, Francis Charette, and Gint Puskorius, published 15 Jul. 2019, the entirety of which is incorporated herein by reference.

The attention recurrent neural network layers 505 output decoder hidden units 515, e.g., $s_i, \ldots s_{i+1}$, that serve as input to a decoder RNN layer 520. The decoder RNN layer 520 may comprise one or more GRUs. For example, the decoder RNN layer 520 may comprise a 2-layer residual GRU. The output of the decoder RNN layer 520 is provided to one or more deconvolutional layers 525. Initially, the deconvolutional layers 525 decode, or reconstruct, a frame 530, $y_i$, corresponding to the initial latent context 425 and the domain attention context 510. The decoded frame 530 then serves as input to the attention recurrent neural network (RNN) layers 505. The decoded frames may then be provided to the decoders 320-1, 320-2 such that the decoders 320-1, 320-2 can reconstruct an image frame.

Figure 6:
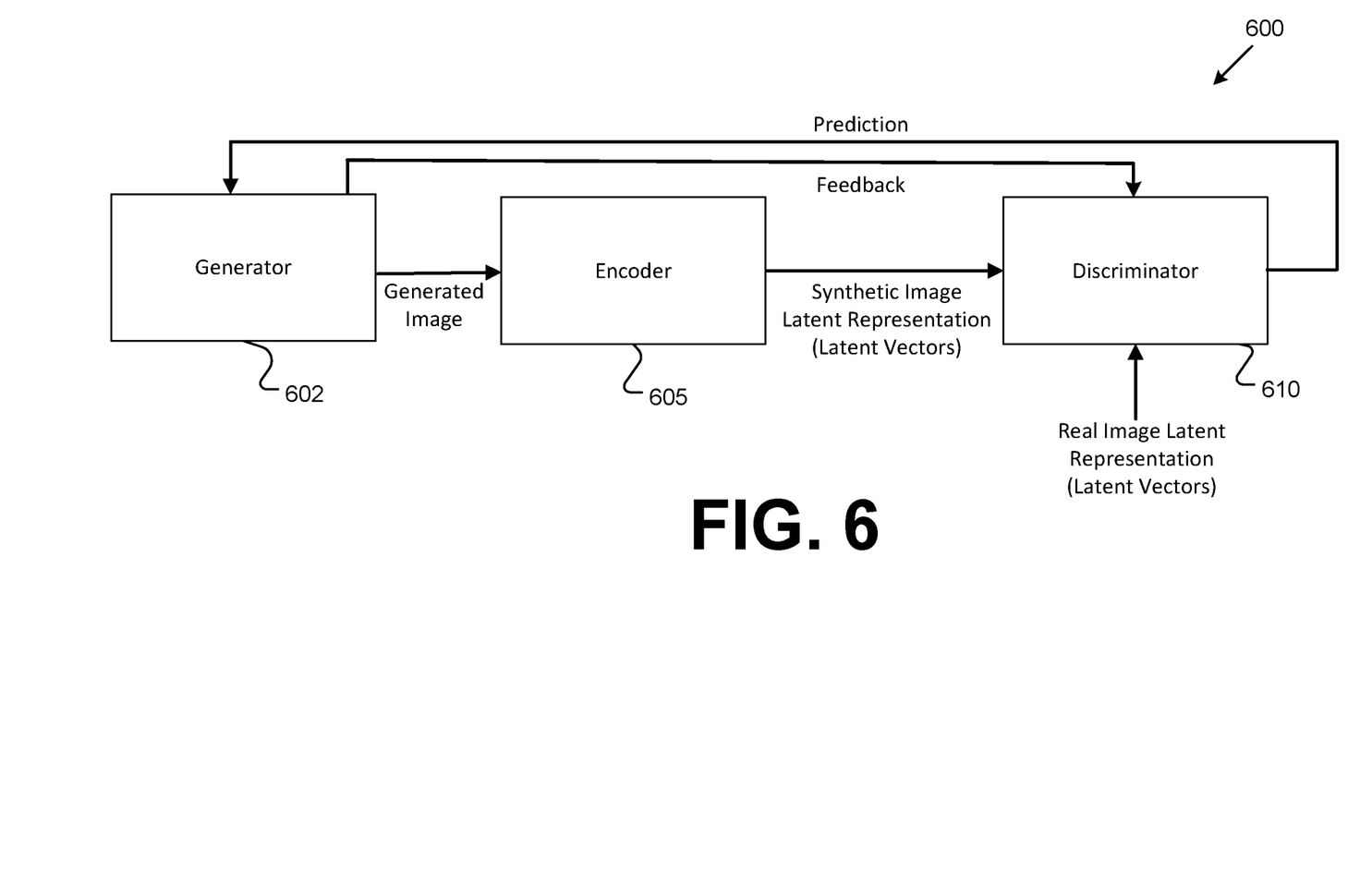
FIG. 6 is a diagram of an example adversarial network.

FIG. 6 is a diagram of an example adversarial neural network 600. The adversarial neural network 600 can be a software program that can be loaded in memory and executed by a processor in the vehicle 105 and/or the server 145, for example. As shown, the adversarial neural network 600 includes a generator 602, an encoder 605, and a discriminator 610. Within the present context, the generator 602 and the discriminator 610 comprise an adversarial network. The adversarial network is a deep neural network that employs a class of artificial intelligence algorithms used in machine learning and implemented by a system of two neural networks contesting each other in an adversarial zero-sum game framework.

In an example implementation, the encoder 605 receives an input image generated by the generator 602. The input images may correspond based on the objects, image views, and/or parameters of the objects depicted in the images. The encoder 605 encodes the image into a latent (i.e. hidden) representation of the input image. The latent feature extractor 305 can be implemented as one or more hidden convolution layers and a fully connected output layer.

The discriminator 610 is configured to receive the latent vectors 607, evaluate the latent vectors 607, and generate a prediction indicative of whether the received latent vectors 607 corresponds to a machine-generated image or corresponds to an image sourced from a real data distribution. The discriminator 610 receives the latent vectors of an image generated by the generator 602 and latent vectors corresponding to an image from a real data distribution during training such that the discriminator 610 can distinguish between latent vectors 607 of synthetic images and latent vectors 607 of images from a real data distribution.

As shown in FIG. 6, the prediction is provided to the generator 602. The generator 602 can use the prediction to modify, i.e., update, one or more weights of the encoder 605 to minimize the predictions indicating the generated image latent vectors are classified as synthetic, i.e., fake. For example, the generator 602 may update one or more weights within the generator 602 using backpropagation, or the like.

The discriminator 610 can also be updated based on the prediction. For example, if the prediction indicates the generated latent vectors corresponds to an image from a real data distribution, the discriminator 610 may receive feedback indicating the latent vectors 607 corresponds to a synthetic image. Based on the feedback, one or more weights of the discriminator 610 can be updated to minimize incorrect predictions.

Figure 7:
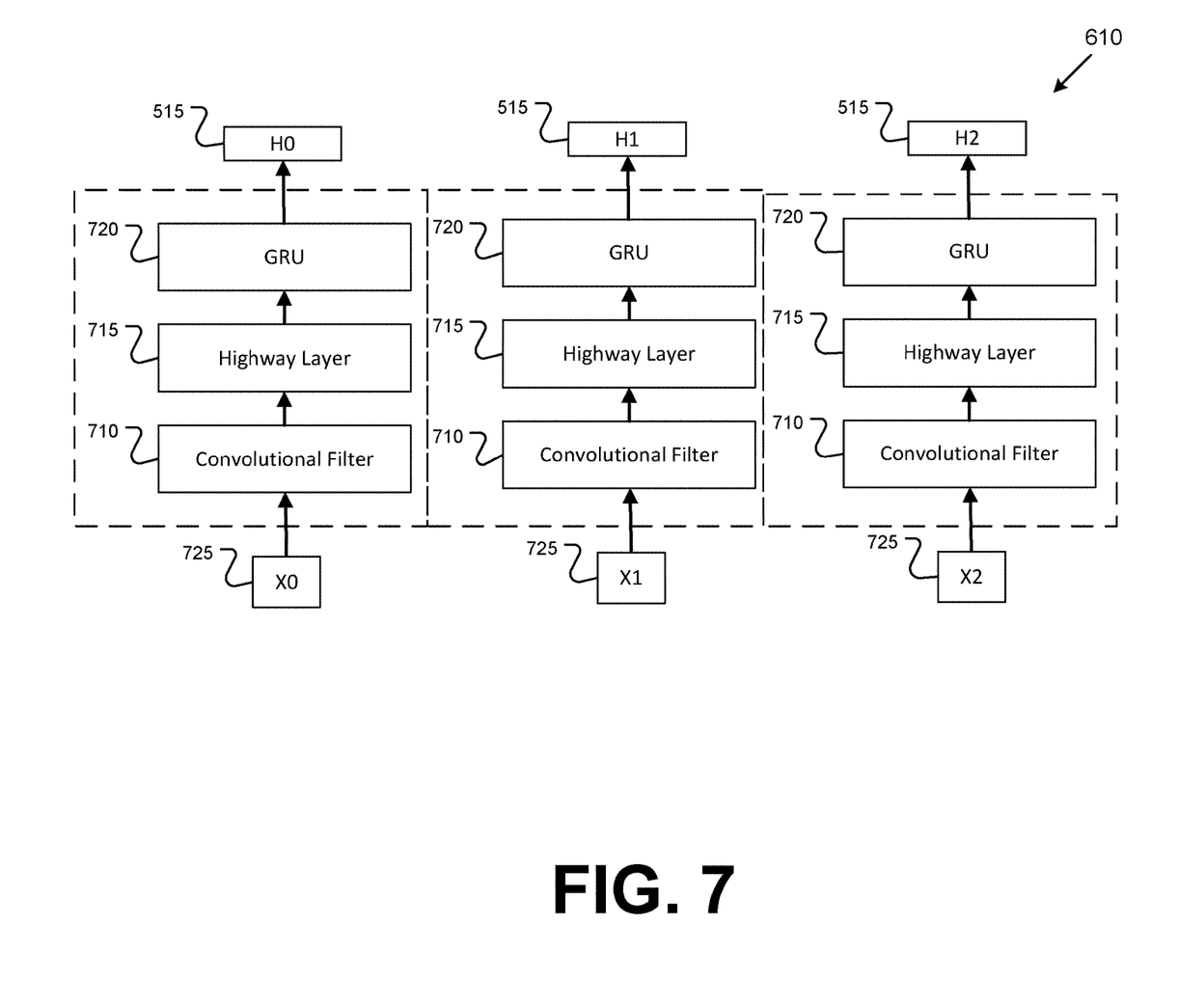
FIG. 7 is a diagram of an example discriminator.

FIG. 7 illustrates an example implementation of the discriminator 610. As shown, the discriminator 610 includes one or more CBHGs 705. For example, the CBHG 705 can include a convolutional filter 710, a highway layer 715, and a GRU 720. The convolutional filter 710 may comprise a bank of 1-D convolutional filters that convolves the received input 725. For example, the received input 725 may comprise latent representations of images, e.g., x0 through x2. The convolution outputs can be provided to the highway layer 715 to extract high-level features. The GRU 720 can receive the extracted high-level features, and the GRU 720 can extract sequential features from both forward and backward context. The output, e.g., prediction, of the discriminator 610 may comprise the last hidden output H2.

Figure 8:
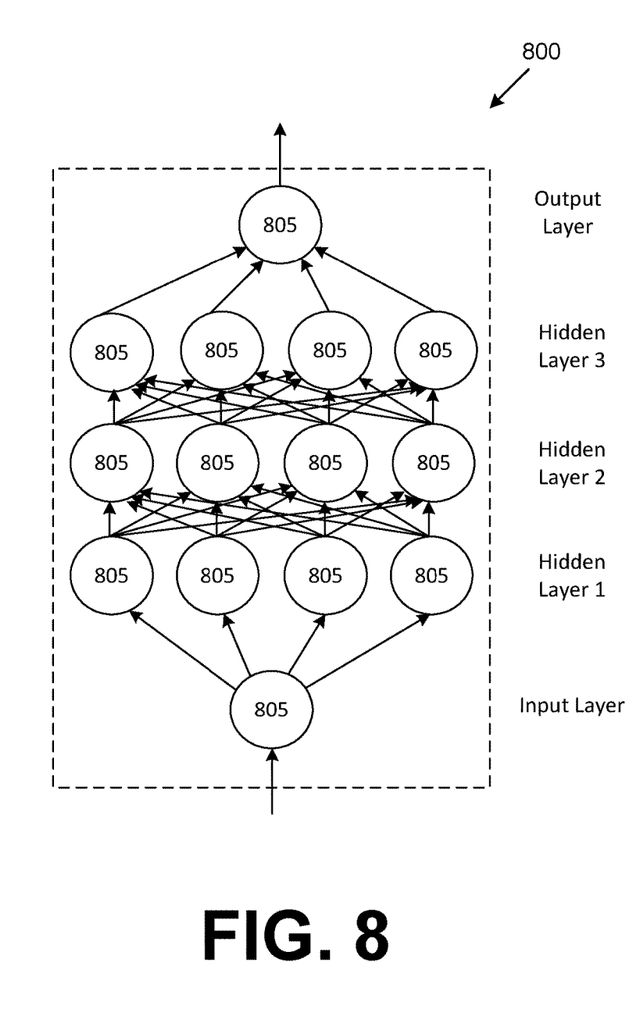
FIG. 8 is diagram of an example deep neural network.

FIG. 8 is a diagram of an example deep neural network (DNN) 800. The DNN 800 may be representative of one or more of the recurrent neural networks described above. The DNN 800 includes multiple nodes 805, and the nodes 805 are arranged so that the DNN 800 includes an input layer, one or more hidden layers, and an output layer. Each layer of the DNN 800 can include a plurality of nodes 805. While FIG. 8 illustrates three (3) hidden layers, it is understood that the DNN 800 can include additional or fewer hidden layers. The input and output layers may also include more than one (1) node 505.

The nodes 805 are sometimes referred to as artificial neurons 805, because they are designed to emulate biological, e.g., human, neurons. A set of inputs (represented by the arrows) to each neuron 805 are each multiplied by respective weights. The weighted inputs can then be summed in an input function to provide, possibly adjusted by a bias, a net input. The net input can then be provided to activation function, which in turn provides a connected neuron 805 an output. The activation function can be a variety of suitable functions, typically selected based on empirical analysis. As illustrated by the arrows in FIG. 8, neuron 805 outputs can then be provided for inclusion in a set of inputs to one or more neurons 805 in a next layer.

The DNN 800 can be trained to accept data as input and generate an output based on the input. The DNN 800 can be trained with ground truth data, i.e., data about a real-world condition or state. For example, the DNN 800 can be trained with ground truth data or updated with additional data by a processor. Weights can be initialized by using a Gaussian distribution, for example, and a bias for each node 805 can be set to zero. Training the DNN 800 can including updating weights and biases via suitable techniques such as backpropagation with optimizations. Ground truth data can include, but is not limited to, data specifying objects within an image or data specifying a physical parameter, e.g., angle, speed, distance, or angle of object relative to another object. For example, the ground truth data may be data representing objects and object labels.

Figure 9:
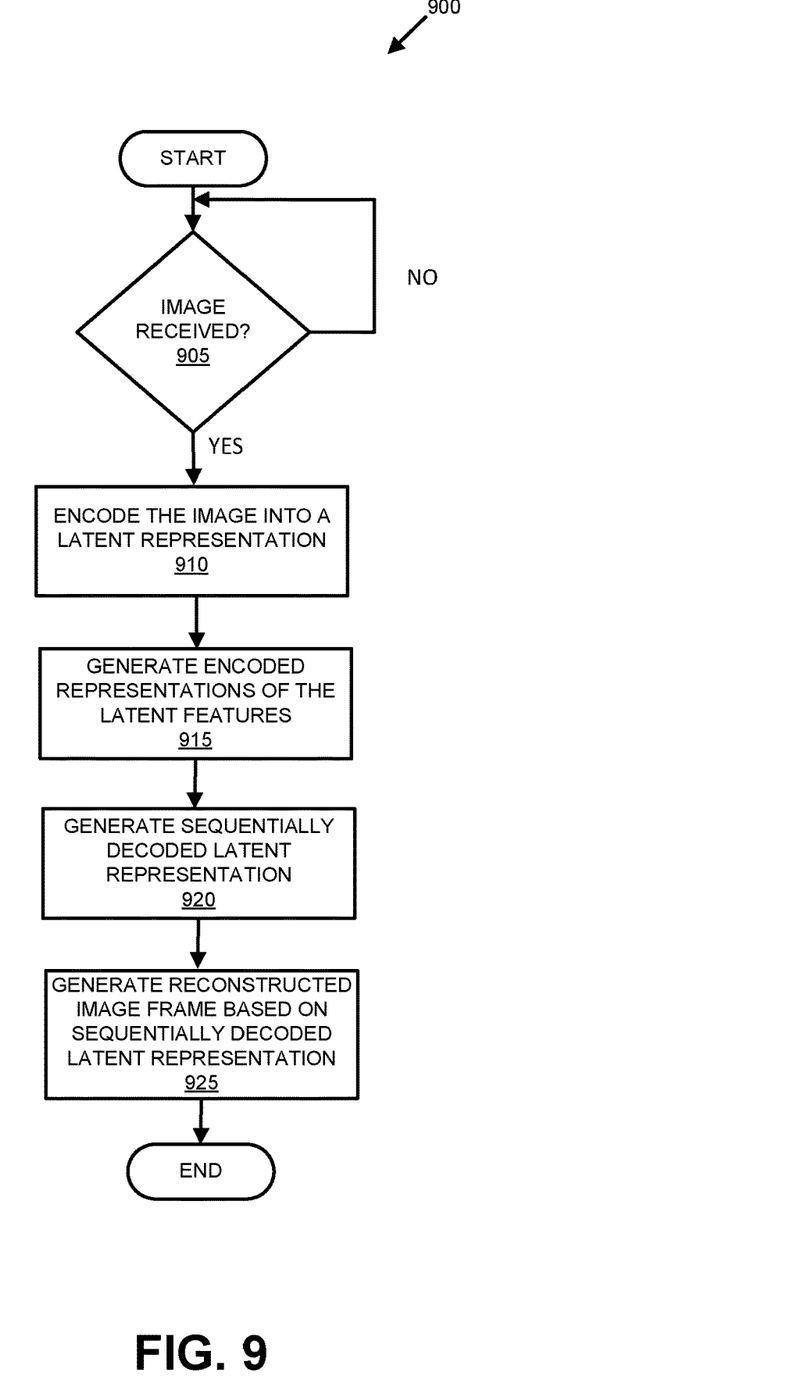
FIG. 9 is a flow diagram for an example process for training a domain translation network.

FIG. 9 is a flowchart of an exemplary process 900 for training a domain adaptation network, such as the domain adaptation network 300. Blocks of the process 900 can be executed by the computer 110 or the computer 235. At block 905, a determination is made whether an input image from a sequence of images associated with a first domain is received. If an image is not received, the process 900 returns to block 905. Otherwise, at block 910, an encoder, such as latent feature extractor 305-1, 305-2, encodes the received image into a latent representation, e.g., latent features, of the image. At block 915, encoded representations of the latent features are generated by a sequential encoder, such as sequential encoder 310-1, 310-2.

At block 920, a sequentially decoded latent representation is generated at a sequential decoder, such as sequential decoder 315-1, 315-2. The sequentially decoded latent representation can be based on encoded representations of the latent features generated by the sequential encoder. At block 925, the decoder, such as decoders 320-1, 320-2, generate a reconstructed image frame based on the sequentially decoded latent representation. The reconstructed frame may be a single image frame from a sequence of images that comprise a video. In some examples, the reconstructed image frame are associated with a second domain. For example, if the first domain corresponds to a daytime image, the second domain corresponds to a nighttime image.

Figure 10:
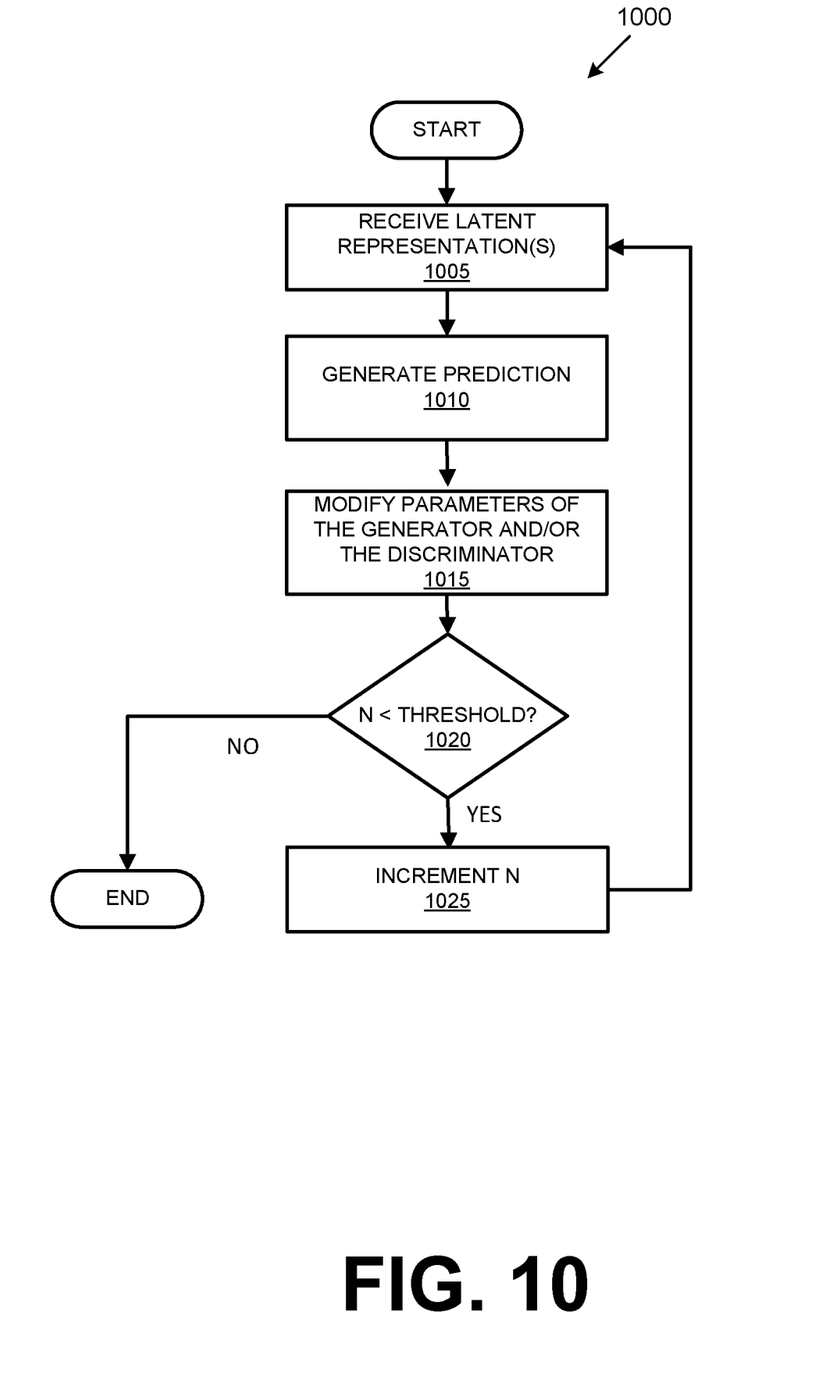
FIG. 10 is a flow diagram for an example process for training a discriminator.

FIG. 10 is a flowchart of an exemplary process 1000 for training a discriminator within an adversarial neural network. Blocks of the process 1000 can be executed by the computer 110 or the computer 235. The process 1000 begins at block 1005 in which one or more latent representations, e.g., latent vectors, of an image are received. The latent representations can be generated by an encoder 605, and the image may be generated by the generator 602.

At block 1010, the discriminator 610 generates a prediction indicative of whether the received latent representations are from a real data distribution or machine-generated image. At block 1015, parameters of the discriminator 610 and/or the generator 602 are modified based on the prediction and/or feedback. For example, one or more weights of the generator 602 and/or the discriminator 610 are updated using backpropagation based on the prediction provided to the generator 602 and/or the feedback provided to the discriminator 610.

At block 1020, a determination whether a counter N is less than a predetermined training threshold. If the counter N is less than the predetermined training threshold, the counter N is incremented at block 1025 and the process 1000 returns to block 1005 to further train the discriminator 610. Otherwise, the process 1000 ends. The predetermined training threshold may be selected based on empirical analysis associated with the training of adversarial networks.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
  receive a sequence of images having a first domain;
  input the sequence of images to each of a plurality of latent feature extractors that output respective latent vectors that have lower dimensionality than the images;
  input the respective latent vectors to respective sequential encoders that each include a respective convolutional filter, and highway network that processes outputs of the convolutional filter, to generate encoded representations of a sequence of latent features of the sequence of images having the first domain;
  receive, at a plurality of decoders, each corresponding to one of the respective encoders, the encoded representations of the sequence of latent features of the image having the first domain; and
  output, from the decoders, respective sets of a reconstructed images for the sequence of images, at least one of the sets of reconstructed images having a second domain.

2. The system of claim 1, wherein the sequential encoders each comprise a gated recurrent unit (GRU) connected to the convolutional filter and highway network, wherein the GRU receives (1) the encoded representations of a sequence of latent features of the image having the first domain, and (2) encoder hidden units output from a previous GRU, to generate the encoded representations of the sequence of latent features of the image.

3. The system of claim 1, wherein the sequential decoders include attention recurrent neural network layers.

4. The system of claim 3, wherein the sequential decoders include decoder recurrent neural network layers connected to the respective attention recurrent neural network layers.

5. The system of claim 4, wherein the sequential decoders include deconvolutional neural network layer connected to the respective decoder recurrent neural network layers.

6. The system of claim 1, wherein the reconstructed image is generated by a generator.

7. A method comprising:
  receiving a sequence of images having a first domain;
  inputting the sequence of images to each of a plurality of latent feature extractors that output respective latent vectors that have lower dimensionality than the images;
  inputting the respective latent vectors to respective sequential encoders that each include a respective convolutional filter, and highway network that processes outputs of the convolutional filter, to generate encoded representations of a sequence of latent features of the sequence of images having the first domain;
  receiving, at a plurality of decoders, each corresponding to one of the respective encoders, the encoded representations of the sequence of latent features of the image having the first domain; and
  outputting, from the decoders, respective sets of reconstructed images for the sequence of images, at least one of the sets of reconstructed images having a second domain.

8. The method of claim 7, wherein the sequential encoders each comprise a gated recurrent unit (GRU) connected to the convolutional filter and highway network, wherein the GRU receives (1) the encoded representations of a sequence of latent features of the image having the first domain, and (2) encoder hidden units output from a previous GRU, to generate the encoded representations of the sequence of latent features of the image.

9. The method of claim 7, wherein the sequential decoders include attention recurrent neural network layers.

10. The method of claim 9, wherein the sequential decoders includes decoder recurrent neural network layers connected to the respective attention recurrent neural network layers.

11. The method of claim 10, wherein the sequential decoders include deconvolutional neural network layer connected to the respective decoder recurrent neural network layers.

12. The method of claim 7, wherein the reconstructed image is generated by a generator.

* * * * *